April 29, 1958     D. D. PATTERSON     2,832,606
PORTABLE PARCEL CARRIERS

Filed Dec. 31, 1954     2 Sheets-Sheet 1

INVENTOR.
DAVID D. PATTERSON
BY
ATTORNEY

April 29, 1958 D. D. PATTERSON 2,832,606
PORTABLE PARCEL CARRIERS

Filed Dec. 31, 1954 2 Sheets-Sheet 2

INVENTOR.
DAVID D. PATTERSON
BY *[signature]*
ATTORNEY

United States Patent Office 2,832,606
Patented Apr. 29, 1958

2,832,606

PORTABLE PARCEL CARRIERS

David D. Patterson, Seward, Nebr.

Application December 31, 1954, Serial No. 479,152

5 Claims. (Cl. 280—37)

This invention relates in general to certain new and useful improvements in portable parcel carriers and is a continuation-in-part of my co-pending application Serial No. 412,192 filed February 24, 1954, now Patent No. 2,777,708, issued January 15, 1957.

Most housewives, in patronizing super markets, endeavor to shop in large quantities for convenience and economy. Such procedure, however, makes it necessary to handle large bags and packages and the physical effort required is appreciable. This is particularly true since the large shopping centers are not ordinarily within short walking distance from the neighborhoods which they serve and it is frequently necessary for the shopper to drive to the shopping center in her automobile or travel on public transportation. Consequently, it has become increasingly difficult to carry several large cumbersome sacks of groceries and other household products from the store to her parked automobile or to her home in case it is necessary to use the streetcar or bus.

It is, therefore, the primary object of the present invention to provide a portable parcel carrier which can be folded up quickly and conveniently into extremely compact size so that it may be readily carried in the hand or under the arm when not in use and which can be very quickly and simply unfolded to provide a spacious, rugged-wheeled carrier into which parcels of various size, shape and weight can be placed for transportation from the store to the home.

It is another object of the present invention to provide a portable carrier of the type stated which can be unfolded and set up with a few simple movements and will automatically form a self-bracing receptacle which, when in opened or receptacle-forming position, is extremely rigid and strong.

It is also an object of the present invention to provide a portable carrier of the type stated which is simple and economical in construction and can be manufactured at relatively low cost.

With the above and other objects in view, my invention resides in the novel features of form, construction, arrangement, and combination of parts presently described and pointed out in the claims.

In the acompanying drawings (two Sheets)—

Figure 1:
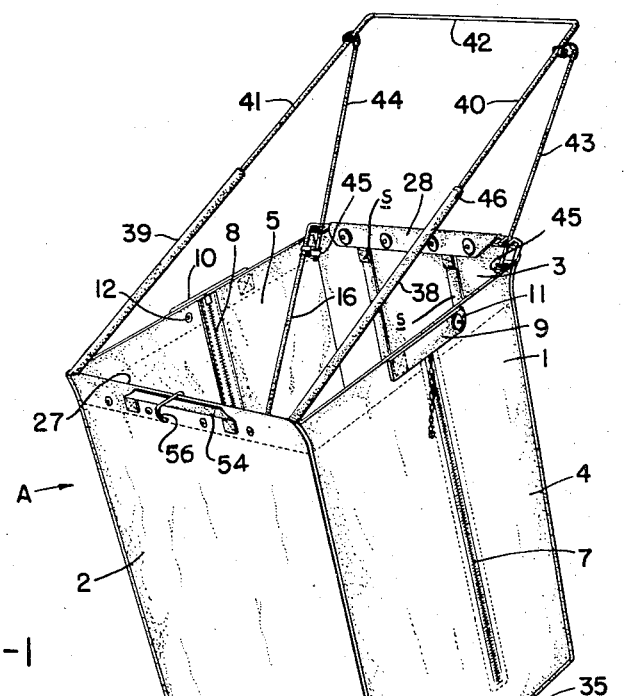
Figure 1 is a perspective view of a portable parcel carrier constructed in accordance with and embodying the present invention illustrating the parcel carrier in fully opened or operative position.

Referring now in more detail and by reference characters to the drawings, which illustrate a preferred embodiment of the present invention, A designates a portable parcel carrier comprising an open-topped rectilinear canvas shell or sack 1 integrally including rectangular front and rear walls 2, 3, side walls 4, 5, and a bottom wall 6. The side walls 4, 5, are centrally split and secured by slide fasteners 7, 8, which extend from a point near the bottom wall up to the top margin and are supplemented by locking straps 9, 10, formed of canvas and being provided at their ends with snap fasteners 11, 12, respectively. The front and rear walls 2, 3, are preferably provided with longitudinal reinforcing straps s stitched or otherwise suitably secured upon the inner faces thereof.

Figure 3:
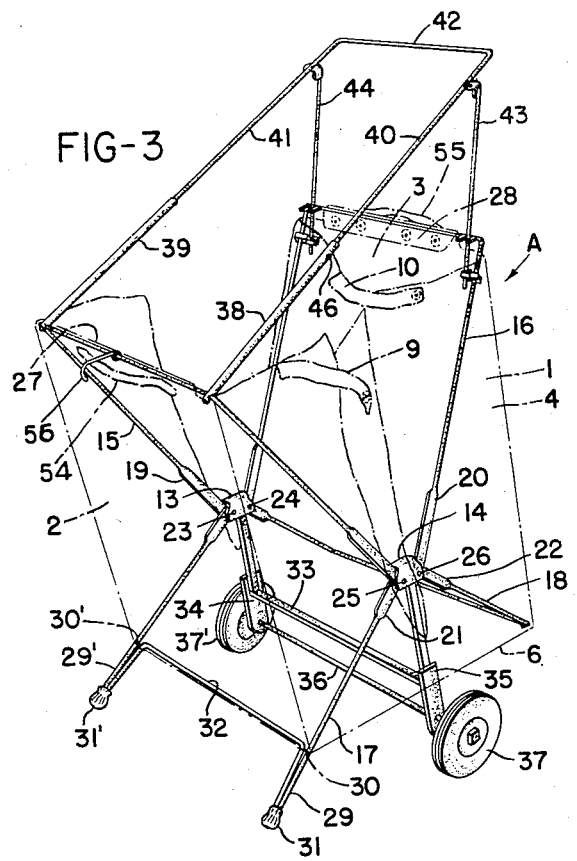
Figure 3 is a skeletonized perspective view of the portable parcel carrier in operative position showing the details of construction of the framework thereof.

Disposed within the canvas sack or shell 1 is a collapsible framework consisting of two central, somewhat U-shaped hinge-elements 13, 14, for rockably receiving the ends of four generally U-shaped frame members 15, 16, 17, 18, formed of heavy wire or rod-stock and being flattened at their inner ends in the provision of short swivel-forming elements 19, 20, 21, 22, respectively, which are rotatably inserted within the hinge elements and are hingedly secured therein by rivets 23, 24, 25, 26. The bight portions of the U-shaped frame members 15, 16, are secured respectively to the upper margins of the side walls 4, 5, by snap fastened canvas flaps 27, 28. By reference to Figures 3 and 5 it will be noted that the upper frame members 15, 16, are mounted in the hinge elements 13, 14, so that when the frame members are in upright position, as shown in Figure 3, the edges of the hinge elements 13, 14, will form stop abutments for the frame members 15, 16. It will also be noted by reference to Figure 3 that the rear lower frame member 18 is shorter than the upper frame members 15, 16, and the other or forward frame member 17 is reversely bent more nearly in the manner of an H to provide legs 29, 29', which project respectively through apertures 30, 30', formed in the corners of the sack 1 and at their lower ends are provided with rubber ferrules 31, 31'. The distance between the cross-bar element 32 of the frame member 17 and the hinge-elements 13, 14, is such that the U-shaped upper portion of the frame member 17 is substantially the same size as the frame member 18.

Rigidly secured at its upper ends to the hinge-elements 13, 14, is a U-shaped bottom frame 33 formed of heavy strap metal and provided at its corners with depending plates 34, 35, for operatively supporting an axle-rod 36 which extends lengthwise therethrough and is, in turn, provided on its projecting ends with rubber-tired wheels 37, 37', which are approximately centered from front to back when the structure is in upright or operative position in order to properly balance the load. As will be evident from Figure 1, the plates 34, 35, project through suitable apertures in the bottom wall 6 of the sack 1 so that the wheels are external to the sack 1 when the latter is in fully opened or operative position. The upper face of the bottom frame 33 is preferably secured, as by riveting, sewing, or gluing, to the central portion of the bottom wall 6.

Figure 5:
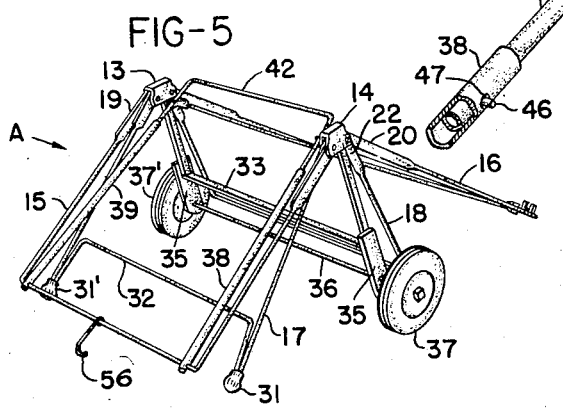
Figure 5 is a perspective view of the framework in partially folded or collapsed position with the cover element removed for illustrative purposes.
Figure 6:
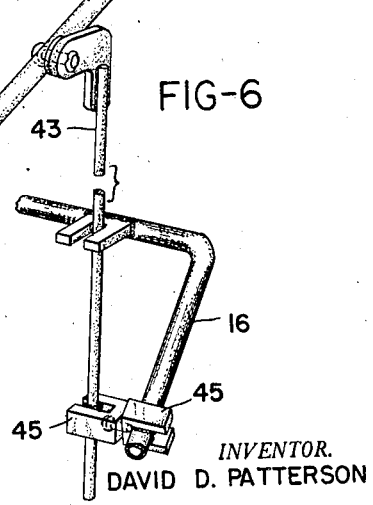
Figure 6 is a fragmentary perspective view of the handle locking structure forming a part of the present invention.

Adjacent the outer upper corners of the canvas sack or shell 1, the flaps 27, 28, are cut away to expose the bight portion of the frame members 15, 16, for hingedly receiving the lower ends of tubular sleeves 38, 39, which telescopically engage the legs 40, 41, of a U-shaped handle-forming member 42, which can be swung upwardly from the position shown in Figure 5 into handle-forming position when the portable carrier A is in operative position, as shown in Figure 3, or can be telescoped into inoperative position, as shown in Figure 5, when the portable carrier A is in collapsed or inoperative position. Hinged to the legs 40, 41, of the handle-forming member 42 are inwardly swinging brace-rods 43, 44, which are also slidably mounted at their lower ends in swiveling clevises 45, which are, in turn, pivotally secured to the rear upper frame member 16, and fit into stabilizing clevises welded thereto when in upright or operative position, as best seen in Figure 6. The legs 40, 41, are, furthermore, provided with conventional spring-biased snap-catch pins 46 for manually releasable locked engagement with apertures 47 formed in the upper ends of the tubular sleeves 38, 39, so that as the handle-forming member 42 reaches fully extended or opened-up position it will be locked in such position until the snap-catch pins 46 are released.

Figure 2:
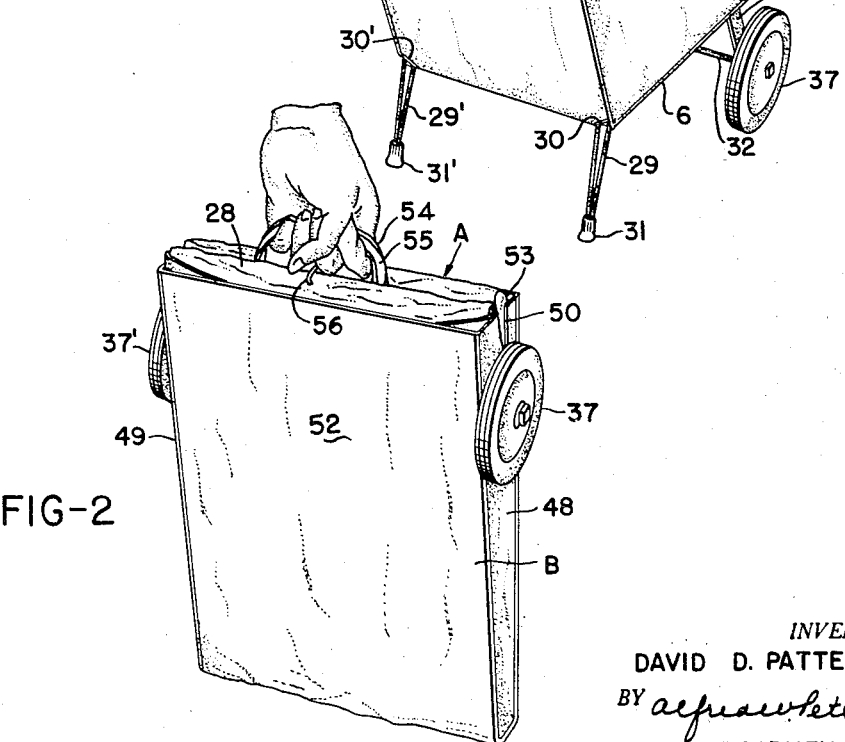
Figure 2 is a perspective view of the portable parcel carrier in completely folded-up or inoperative position.
Figure 4:
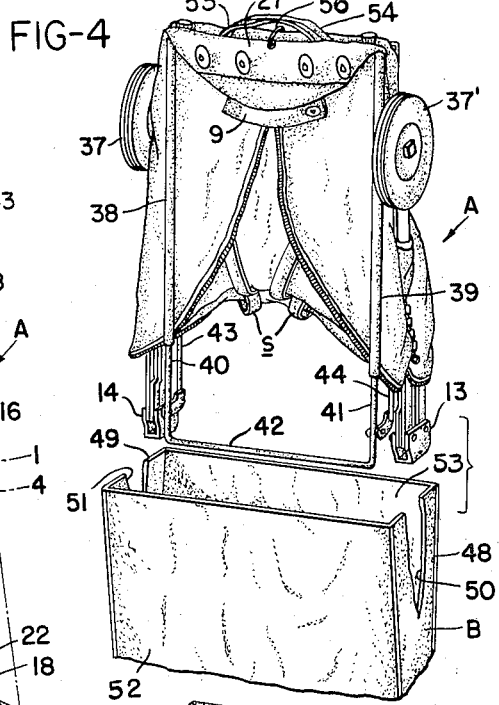
Figure 4 is a perspective view of the parcel carrier in folded-up position as it is being placed in its outer bag or carrying receptacle.

Provided for use with the parcel carrier A is a rectilinear bag B adapted to fit snugly around the parcel carrier A in the manner of an envelope and being provided with side walls 48, 49, respectively, having V-shaped slits 50, 51, which clear the wheels 37, 37', and axle-rod 36 and front and rear walls 52 and 53. The front wall 2 and rear wall 3 are respectively provided at their upper margins with cloth handles 54, 55, which project upwardly when the carrier A is in collapsed position, as shown in Figures 2 and 4 and, finally, a small hook 56 is mounted on the bight of the frame member 15 for hooked engagement with the bight of the frame member 16, as shown in Figure 4. Thus, when collapsed, the carrier A becomes a compact, easily handled unit which is conveniently housed in the bag B and can be carried from place to place as shown in Figure 2.

When the frame members 15, 16, 17, and 18 are folded out into upright or operative position so that the bight members thereof move outwardly away from each other, the bottom wall 6 is stretched to its largest dimension, whereupon the slide fasteners 7, 8, may be pulled up and the locking straps 9, 10, fastened in place, forming a rigid, strong carrier, as shown in Figure 1.

When the portable carrier A is being folded up or collapsed, that is to say, folded from the position shown in Figure 1 to the collapsed position shown in Figure 4, the snap-catch pins 46 are released, the straps 9, 10, are disengaged and the slide fasteners 7, 8, slid open, thus permitting the frame members 15, 16, 17, 18, to swing outwardly and downwardly so that the entire structure can be folded up. The canvas sack or shell 1, being entirely flexible and collapsible, will fall into a series of folds within the framework so that the entire structure will be compact and can be slid into the bag B. Thus, there will be no exposed metal or hard parts to tear the clothing or cause any other type of inconvenience. It will be noted that the handles 54, 55, are fastened on the outer faces of the front and rear walls 2, 3, and are also internally positioned, when the carrier A is folded up, so that the entire structure can be easily carried without using the bag B if the user so desires.

In the collapsed or inoperative position, the structure is extremely compact, light in weight, and can be easily carried from place to place. Thus, the housewife may readily travel to the shopping center, either in her own car or on some public conveyance with the portable carrier A folded up into very compact, easily carried position. Upon arriving at the market or store, the housewife may readily remove the bag B and swing the frame members 15, 16, 17, and 18, into the position shown in Figure 3. This movement will automatically cause the sack 1 to open up into proper position and the entire structure may be rigidly secured in upright carrier-forming position simply by sliding up the slide fasteners 7, 8, to close the side walls 4, 5, and then fastening the straps 9, 10. The tension thus placed on the side walls will pull the entire frame into tight, rigid, upright position to form a secure carrier of relatively large dimension which is strong and rigid. This movement of folding the carrier A into upright position will automatically cause the wheels 37, 37', to swing down into operative position. It should be understood in this connection that buttons, hooks, snap fasteners, or even laces may be substituted for the slide fasteners 7, 8.

It should be understood that changes and modifications in the form, construction, arrangement, and combination of the several parts of the portable parcel carrier may be made and substituted for those herein shown and described without departing from the nature and principle of my invention.

Having thus described my invention, what I claim and desire to secure by Letters Patent is:

1. A portable parcel carrier comprising a collapsible wire framework adapted to fold from a flat collapsed position to open position, in which latter position the framework defines a rectilinear structure, said framework consisting of a U-shaped bottom frame-element consisting of a transversely extending bight and two spaced parallel upstanding legs each of which is rigidly provided at its upper end with a hinge-element, four substantially U-shaped frame-members each hinged to and radiating outwardly from the hinge-elements, a collapsible shell operatively mounted on the framework for forming an open-topped rectilinear receptacle when the framework is in open position, ground-engaging wheels operatively mounted on the framework and being positioned for projecting downwardly below the bottom of the shell when the latter is in open receptacle-forming position, handle-forming means associated with the framework, said handle-forming means comprising a pair of tubes each being pivoted at one end to the bight portion of one of the frame-members and a U-shaped member having its legs telescopically fitted in the tubes for extending upwardly therefrom when the framework is in open position.

2. A portable parcel carrier comprising a collapsible wire framework adapted to fold from a flat collapsed position to open position, in which latter position the framework defines a rectilinear structure, said framework consisting of a U-shaped bottom frame-element consisting of a transversely extending bight and two spaced parallel upstanding legs each of which is rigidly provided at its upper end with a hinge-element, four substantially U-shaped frame-members each hinged to and radiating outwardly from the hinge-elements, a collapsible fabric shell mounted externally on the framework for forming an open-topped rectilinear receptacle when the framework is in open position, said shell having opposite side walls which are split and provided with means for optionally opening and closing the split, an axle rod carried by the frame-element, ground-engaging wheels mounted on the axle-rod and being positioned for projecting downwardly below the bottom of the shell when the latter is in open receptacle-forming position and handle-forming means associated with the framework, said handle-forming means comprising a pair of tubes each being pivoted at one end to the bight portion of one of the frame-members and a U-shaped member having its legs telescopically fitted in the tubes for extending upwardly therefrom when the framework is in open position.

3. A portable parcel carrier comprising a collapsible wire framework adapted to fold from a flat collapsed position to open position, in which latter position the framework defines a rectilinear structure, said framework consisting of a U-shaped bottom frame-element consisting of a transversely extending bight and two spaced parallel upstanding legs each of which is rigidly provided at its upper end with a hinge-element, four substantially U-shaped frame-members each hinged to and radiating outwardly from the hinge-elements, a collapsible shell operatively mounted on the framework for forming an open-topped rectilinear receptacle when the framework is in open position, ground-engaging wheels operatively mounted on the framework and being positioned for projecting downwardly below the bottom of the shell when the latter is in open receptacle-forming position, handle-forming means associated with the framework, said handle-forming means comprising a pair of tubes each being pivoted at one end to the bight portion of one of the frame-members, a U-shaped member having its legs telescopically fitted in the tubes for extending upwardly therefrom when the framework is in open position and brace rods hingedly connected to the U-shaped member and to the opposite legs respectively of one of the other frame-members for supporting the U-shaped member in handle-forming position.

4. A portable parcel carrier comprising a collapsible wire framework adapted to fold from a flat collapsed position to open position, in which latter position the framework defines a rectilinear structure, said framework consisting of a U-shaped bottom frame-element consisting of a transversely extending bight and two spaced parallel upstanding legs each of which is rigidly provided at its upper end with a hinge-element, four substantially U-shaped frame-members each hinged to and radiating outwardly from the hinge-elements, a collapsible shell operatively mounted on the framework for forming an open-topped rectilinear receptacle when the framework is in open position, ground-engaging wheels operatively mounted on the framework and being positioned for projecting downwardly below the bottom of the shell when the latter is in open receptacle-forming position, handle-forming means associated with the framework, said handle-forming means comprising a pair of tubes each being pivoted at one end to the bight portion of one of the frame-memers, a U-shaped member having its legs telescopically fitted in the tubes for extending upwardly therefrom when the framework is in open position, and means for optionally locking the U-shaped member and the tubes together in handle-forming position.

5. A portable parcel carrier comprising a collapsible wire framework adapted to fold from a flat collapsed position to open position, in which latter position the framework defines a rectilinear structure, said framework consisting of a U-shaped bottom frame-element consisting of a transversely extending bight and two spaced parallel upstanding legs each of which is rigidly provided at its upper end with a hinge-element, four substantially U-shaped frame-members each hinged to and radiating outwardly from the hinge-elements, a collapsible shell operatively mounted on the framework for forming an open-topped rectilinear receptacle when the framework is in open position, ground-engaging wheels operatively mounted on the framework and being positioned for projecting downwardly below the bottom of the shell when the latter is in open receptacle-forming position, handle-forming means associated with the framework, said handle-forming means comprising a pair of tubes each being pivoted at one end to the bight portion of one of the frame-members, a U-shaped member having its legs telescopically fitted in the tubes for extending upwardly therefrom when the framework is in open position, brace rods hingedly connected to the U-shaped member and to one of the other frame-members for supporting the U-shaped member in handle-forming position and means for optionally locking the U-shaped member and the tubes together in handle-forming position.

References Cited in the file of this patent

UNITED STATES PATENTS

| 1,033,324 | Judge et al. | July 23, 1912 |
| 1,060,697 | Newerf | May 6, 1913 |
| 1,769,418 | Cooper et al. | July 1, 1930 |
| 2,313,884 | Mattoon | Mar. 16, 1943 |
| 2,571,442 | Griffith | Oct. 16, 1951 |

FOREIGN PATENTS

| 382,776 | Germany | Oct. 6, 1923 |